United States Patent Office 3,116,139
Patented Dec. 31, 1963

3,116,139
METHOD OF CONTROLLING UNDESIRED VEGETATION
Klaus Juergen Fust, Ludwigshafen (Rhine), Adolf Fischer, Mutterstadt/Pfalz, Herbert Friederich, Worms, and Herbert Stummeyer, Mannheim, Germany, assignors to Badische Anilin- & Soda-Fabrik Aktiengesellschaft, Ludwigshafen (Rhine), Germany
No Drawing. Continuation of application Ser. No. 10,096, Feb. 23, 1960. This application Aug. 1, 1961, Ser. No. 128,394
Claims priority, application Germany Feb. 28, 1959
8 Claims. (Cl. 71—2.3)

The present invention relates to a method of controlling undesired vegetation and of defoliating plants.

Although numerous agents are known for controlling broad-leaved weeds, there is still a great demand for substances which are suitable for selectively controlling gramineous weeds in broad-leaved crop plants. This shortcoming can be overcome by treating the field prior to the sowing with substances which prevent the sprouting of seeds of gramineous weeds which are ready to germinate so that when the crop plants are sown the field is substantially freed from weeds. The substances conventionally used for this purpose include non-chlorinated carbamic acid esters such as isopropyl phenyl carbamate, or chlorinated fatty acids, such as trichloracetic acid or α,α-dichloropropionic acid. In most cases however, these substances are not sufficiently selective, so that the sprouting crop plants are also damaged. Moreover, it is necessary to allow a certain time to elapse between the application of the said agents and the sowing of the crop plants. This makes planning in agricultural establishments difficult or often impossible, especially in unfavorable climatic conditions. In agricultural practice it is therefore advantageous to have weedkillers which can be applied after sowing. These so-called pre-emergence agents are required to have a high selectivity, i.e., the weed sprout should be killed without the crop plants being damaged.

It is an object of the present invention to provide a method of controlling wild oats (Avena fatua). Another object of the invention is a method for the defoliation of crop plants. A further object is a method for controlling weeds without destroying crop plants.

According to the present invention these objects are achieved by using 5-methylene-1,2,3,4,7,7-hexachlor-bicyclo-(2,2,1)-heptene-(2), which has the following constitutional formula:

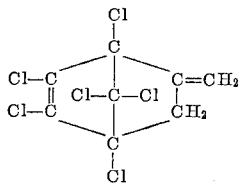

for controlling undesired vegetation and defoliation of crop plants. 5-methylene-1,2,3,4,7,7-hexachlor-bicyclo-(2,2,1)-heptene-(2) can be prepared from 5-halogenmethyl - 1,2,3,4,7,7-hexachlor-bicyclo-(2,2,1)-heptene-(2) by splitting off hydrogen halide with known hydrogen halide acceptors, for example by the action of alkalihydroxide. 5-halogenmethyl-1,2,3,4,7,7-hexachlor-bicyclo-(2,2,1)-heptene-(2) can be obtained by reaction of allyl halide with hexachlorcyclopentadiene according to Diels-Alder.

5 - methylene-1,2,3,4,7,7-hexachlor-bicyclo-(2,2,1)-heptene-(2) is a colorless liquid of the boiling point 100° to 105° C. at a pressure of 0.5 mm. Hg. Analysis of this substance gives the following result:

Calculated for $C_8H_4Cl_6$: C, 30.72%; H, 1.3%; Cl, 68.0%. Found: C, 30.82%; H, 1.5%; Cl, 67.1%.

The particular advantage involved in using this compound as a weedkiller lies in the fact that it has a specific activity against wild oats—which is known to be difficult to control—in fields of broad-leaved root vegetables, such as sugar beet, turnips, cabbages, potatoes or corn. When used for pre-emergence treatment, damage to the said crop plants is reliably avoided. The compound can also be used as a defoliation agent; for this latter purpose it is scattered or dusted onto the leaves immediately prior to the ripening of the crop plants.

In order to control the weeds the active substance is used in a phytotoxic quantity, i.e., a quantity sufficient to achieve the desired effect. This quantity depends on quite a number of factors, for example, climate, condition of the weeds and crop plants, condition of the soil, season, etc. In many cases, amounts between 4 and 20 kg. of active substance per hectare may be considered phytotoxic quantities. The same amounts may be used for defoliation purposes.

The substance may also be used in the form of an aqueous emulsion. For the preparation of the emulsions there may be used surface-active substances of anionic, cationic or electrically neutral type. Suitable substances of this type include sodium alkylnaphthalene sulfonates, sodium lignin sulfonates, sodium lauryl sulfate, glycerin monostearate, polyethylene oxides or quaternary ammonium salts. Incorporation of organic solvents, such as methanol, isopropanol, isobutanol, xylene, toluene, cresol or cyclohexanone, is often advantageous. The use of the said herbicidal compound is however not limited to this form. When the active substance is to be used as a dusting agent or strewing agent, it may be mixed with inert solid substances, as for example talc, bentonite, pyrophyllite, diatomaceous earth or silica gel, or with fertilizers, preferably calcium nitrate.

The following examples illustrate the effectiveness of the new substance as a herbicide and defoliating agent.

Example 1

Seeds of the following plants are sown in light sandy soil: wild oats (Avena fatua), rye (Secale cereale), mustard (Sinapis alba) and buck wheat (Fagopyrum esculentum). On the soil thus prepared 5-methylene-1,2,3,4,7,7-hexachlor-bicyclo-(2,2,1)-heptene-(2) is sprayed in an amount corresponding to 4 kilograms per hectare in the form of an aqueous emulsion which has been prepared with an addition of sodium lignin sulfonate in an amount of water corresponding to 500 liters per hectare. Mustard and buck wheat sprout well and develop further in normal manner. Rye and wild oats are strongly inhibited in growth by this treatment and slowly die after about 3 to 4 weeks.

Example 2

5 - methylene-1,2,3,4,7,7-hexachlor-bicyclo-(2,2,1)-heptene-(2) is uniformly sprayed in an amount corresponding to 10 kilograms per hectare in the form of an aqueous emulsion which has been prepared with an addition of sodium lignin sulfonate in an amount of water corresponding to 1000 liters per hectare over plants of sugar beet, carrots and onions (height of growth 5 to 10 centimeters) shortly after the soil has been hoed. After 5 weeks, the following monocotyledonous plants in the treated parcels are strongly inhibited in growth or completely destroyed: wild oats (Avena fatua), annual meadow grass (Poa annua), English rye grass (Lolium perenne), slender fox-tail (Alepecurus myosuroides), cock-spur panicum (Panicum crusgalli) and fingered panicum (Panicum sanguinale).

Example 3

Dwarf bean plants, shortly before ripening, are dusted uniformly with a dusting agent containing 12% of 5-methylene-1,2,3,4,7,7-hexachlor-bicyclo-(2,2,1)-heptene-(2) and 88% of kaolin. After 4 to 6 days, the leaves of the plants exhibit clear yellowing. 14 days after the treatment, all the leaves have fallen off. The bean pods and the stalks of the plants do not exhibit any corrosive damage after this treatment or after the shedding of the leaves.

This application is a continuation of our application Serial No. 10,